(12) United States Patent
Kim et al.

(10) Patent No.: US 8,817,388 B2
(45) Date of Patent: Aug. 26, 2014

(54) IMAGING DEVICE

(71) Applicant: SEHF-Korea Co., Ltd., Gyeongsangbuk-do (KR)

(72) Inventors: Sang Jo Kim, Gyeonggi-do (KR); Moon Joon Kim, Gyeongsangbuk-do (KR); Hyun Woo Ji, Daegu (KR); Jeong Soon Kang, Gyeongsangbuk-do (KR); Beom Sik Kim, Gyeongsangbuk-do (KR); Jun Su Kim, Gyeongsangbuk-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 13/659,140

(22) Filed: Oct. 24, 2012

(65) Prior Publication Data
US 2013/0335615 A1  Dec. 19, 2013

(30) Foreign Application Priority Data

Jun. 15, 2012 (KR) .................. 10-2012-0064309

(51) Int. Cl.
*G02B 13/18* (2006.01)
*H04N 5/225* (2006.01)
*G02B 13/00* (2006.01)

(52) U.S. Cl.
CPC ............. *G02B 13/004* (2013.01); *G02B 13/18* (2013.01); *H04N 5/225* (2013.01)
USPC ......................................... 359/715; 348/340

(58) Field of Classification Search
CPC ...... G02B 13/00; G02B 13/004; G02B 13/18; G02B 9/34
USPC .......................... 348/340; 359/715, 771, 781
See application file for complete search history.

(56) References Cited

U.S. PATENT DOCUMENTS 7,808,722 B2 * 10/2010 Tonucci ................. 359/717
7,826,149 B2 * 11/2010 Tang et al. ............. 359/715

FOREIGN PATENT DOCUMENTS

KR    1020110094979 A    8/2011

OTHER PUBLICATIONS

Korean Intellectual Property Office, English Abstract of Korean Publication No. 1020110094979A, published on Aug. 24, 2011, copyright KIPO 2011 (2 pages).

* cited by examiner

*Primary Examiner* — David N Spector
(74) *Attorney, Agent, or Firm* — Wood, Herron & Evans, LLP

(57) ABSTRACT

Provided is an imaging device for mobile devices such as a mobile phone, using a high resolution image sensor such as a charge coupled device (CCD) and a complementary metal oxide semiconductor (CMOS).

7 Claims, 8 Drawing Sheets

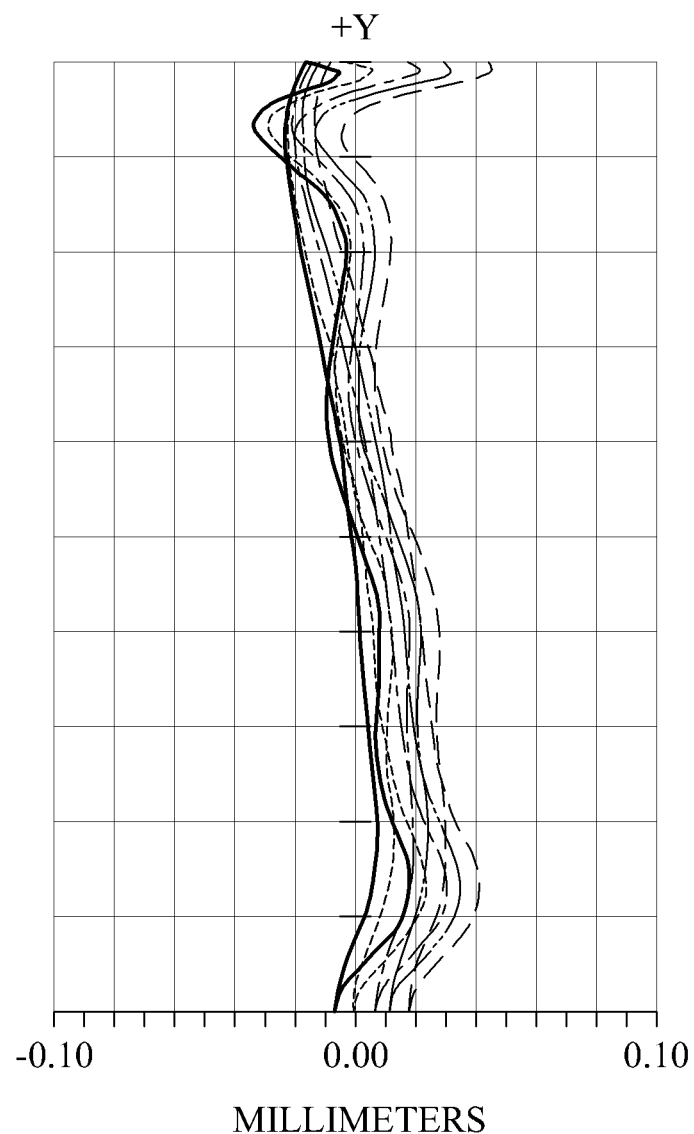

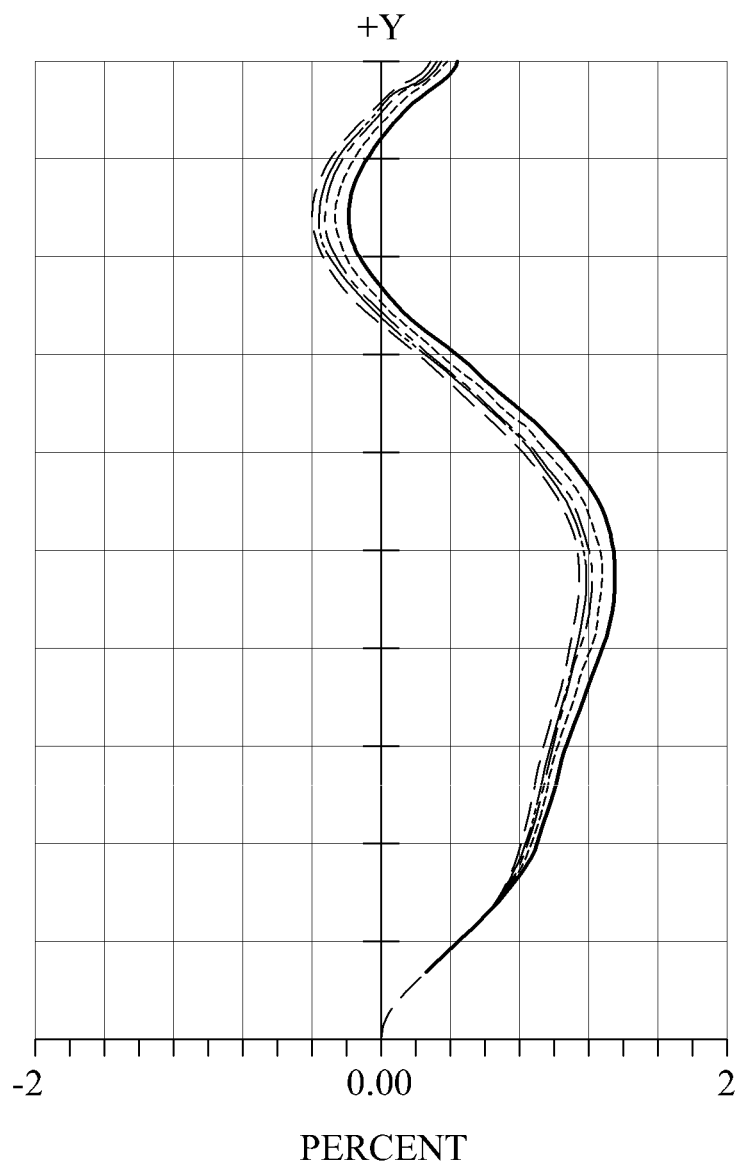

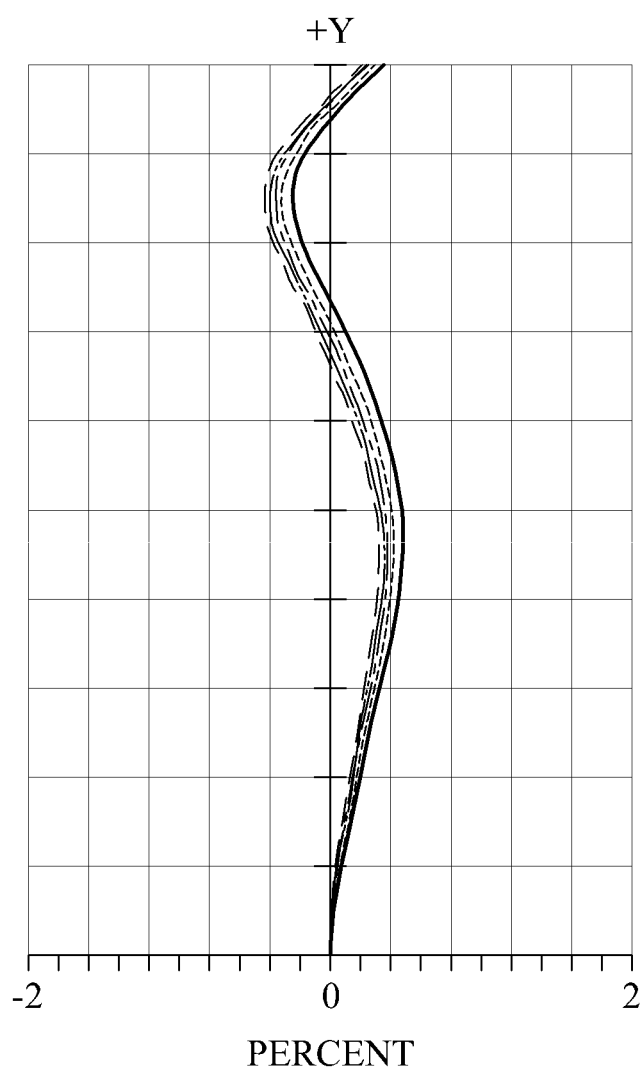

IMAGING DEVICE

CROSS-REFERENCE TO RELATED APPLICATION

The present application claims priority under 35 U.S.C. §119 of Korean Patent Application No. 10-2012-0064309, filed Jun. 15, 2012, the disclosure of which is hereby incorporated herein by reference in its entirety.

FIELD OF THE INVENTION

Example embodiments of the following description relate to an imaging device using a high resolution image sensor such as a charge coupled device (CCD) and a complementary metal oxide semiconductor (CMOS), and more particularly, to an imaging device used for mobile devices such as a mobile phone.

BACKGROUND OF THE INVENTION

Recently, resolution of an imaging device equipped in a mobile device has increased. Also, according to decrease in a pixel size of an image sensor, high performance and high transmittance of the imaging device are being required.

However, to implement the high performance and high transmittance in a conventional imaging device, height of a space for receiving a lens needs to be increased for an entire length of the imaging device. In this case, a clearance space behind the lens is reduced while an aperture of an entrance pupil to which light is incident is increased. As a result, it becomes difficult to manufacture a small size product appropriate for the mobile device.

SUMMARY OF THE INVENTION

According to one general aspect, there is provided an imaging device equipped with a photodetector, including a first lens having a positive or negative refractive power; a second lens having a positive or negative refractive power and including an object side which is concave; a third lens having a positive or negative refractive power and including an object side and an imaging side which are both aspherical; and a fourth lens having a positive or negative refractive power and including an object side and an imaging side which are both aspherical, wherein the first lens to the fourth lens may be arranged in sequence from an object, and the imaging device may meet Conditional Expression 1 to Conditional Expression 3:

$0.25 < FBL/f < 0.35$       [Conditional Expression 1]

$3.5 < OL/FBL < 4.5$       [Conditional Expression 2]

$f/D \leq 2.6$       [Conditional Expression 3]

wherein FBL denotes a distance from a last imaging side to a photodetector of a device part in the imaging device, OL denotes a distance from the object side of the first lens to the photodetector with reference to an optical axis, f denotes a focal length of the imaging device with reference to the optical axis, and D denotes an aperture of an entrance pupil of the imaging device.

The imaging device may further include an aperture diaphragm disposed at the object side of the first lens or between the first lens and the second lens.

At least one of the first lens to the fourth lens may have a refractive index of about 1.610 or greater with reference to the refractive index.

The second lens may meet Conditional Expression 4:

$-5.0 > L2R1 > -10.0$       [Conditional Expression 4]

wherein, L2R1 denotes a radius of the object side of the second lens.

The second lens may meet Conditional Expression 5-1:

$0.5 < L2R2 < 4.0$       [Conditional Expression 5-1]

wherein, L2R2 denotes a radius of the imaging side of the second lens.

The fourth lens may meet Conditional Expression 5-2:

$0.5 < L4R2 < 4.0$       [Conditional Expression 5-2]

wherein, L4R2 denotes a radius of the imaging side of the fourth lens.

The second lens may meet Conditional Expression 6:

$1.5 < f1 < 2.5$       [Conditional Expression 6]

wherein, f1 denotes a focal length of the first lens.

The second lens may meet Conditional Expression 7:

$-4.0 < f2 < -3.0$       [Conditional Expression 7]

wherein, f2 denotes a focal length of the second lens.

BRIEF DESCRIPTION OF THE DRAWINGS

These and/or other aspects, features, and advantages will become apparent and more readily appreciated from the following description of exemplary embodiments, taken in conjunction with the accompanying drawings of which:

FIGS. 3A to 3C are graphs illustrating an aberration of the imaging device of FIG. 1, in which FIG. 3A shows a longitudinal spherical aberration, FIG. 3B shows an astigmatic field curve, and FIG. 3C shows a distortion; and FIGS. 4A to 4C are graphs illustrating an aberration of the imaging device of FIG. 2, in which FIG. 4A shows a longitudinal spherical aberration, FIG. 4B shows an astigmatic field curve, and FIG. 4C shows a distortion.

DETAILED DESCRIPTION OF THE INVENTION

Figure 1:
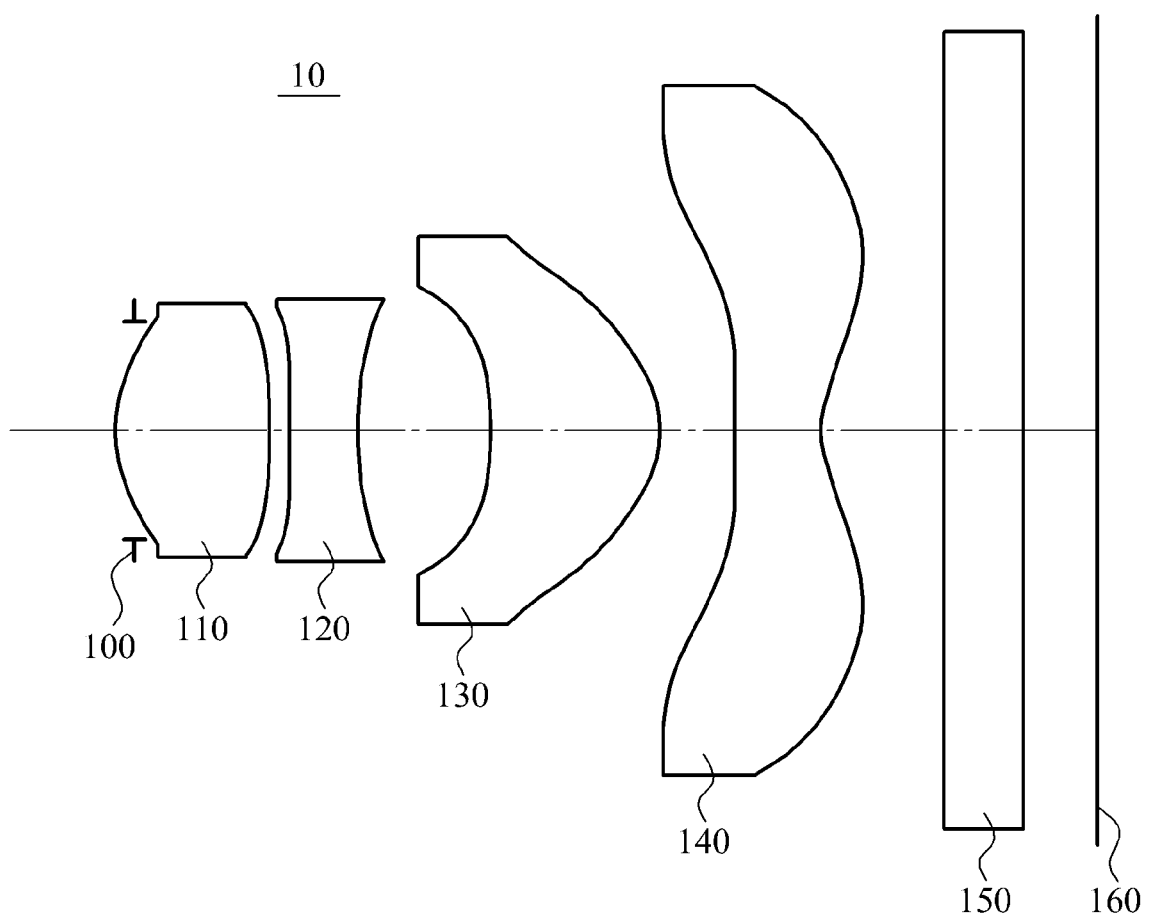
FIG. 1 is a sectional diagram of an imaging device according to an exemplary embodiment.

Reference will now be made in detail to exemplary embodiments, examples of which are illustrated in the accompanying drawings, wherein like reference numerals refer to the like elements throughout. Moreover, detailed descriptions related to well-known functions or configurations will be ruled out in order not to unnecessarily obscure subject matters.

Hereinafter, imaging devices according to exemplary embodiments will be described in detail with reference to FIGS. 1 to 2.

An imaging device 10 according to an embodiment of FIG. 1 may include a first lens 110, a second lens 120, a third lens 130, and a fourth lens 140. The imaging device 10 may be configured in such a manner that the first lens 110, the second lens 120, the third lens 130, the fourth lens 140, a filter 150, and a photodetector 160 are arranged in sequence from an object.

In the following description, an "object side" will refer to a side of a lens directed to the object with reference to an optical axis, that is, a left side in FIGS. 1 and 2. An "imaging side" will refer to another side of the lens directed to an imaging surface with reference to the optical axis, that is, a right side in the drawings.

An aperture diaphragm 110 is disposed in front of the first lens 110.

The first lens to fourth lens 110, 120, 130, and 140 may each have a positive or negative refractive power. In one example, the first lens to fourth lens 110, 120, 130, and 140 may have a refractive index in a range between about 1.4 and about 2.0. At least one of the first lens to fourth lens 110, 120, 130, and 140 may have a refractive index of about 1.61 or greater.

The second lens 120 may have the object side and the imaging side both in a concave shape. The third lens 130 may have the object side and the imaging side both in an aspherical shape. The fourth lens 140 may have the object side and the imaging side both in an aspherical shape.

At least one of an infrared filter and an optical filter such as a cover glass may be used as the filter 150. The photodetector 160 may include an image sensor, for example, a charge coupled device (CCD) and a complementary metal oxide semiconductor (CMOS).

The first lens to fourth lens 110, 120, 130, and 140 may be configured to meet Conditional Expression 1 to Conditional Expression 3, as follows:

$$0.25 < FBL/f < 0.35 \quad \text{[Conditional Expression 1]}$$

$$3.5 < OL/FBL < 4.5 \quad \text{[Conditional Expression 2]}$$

$$f/D \leq 2.6 \quad \text{[Conditional Expression 3]}$$

Reference symbols used in Conditional Expression 1 to Conditional Expression 3 will be defined, as follows:
- FBL: distance from a last imaging side to a photodetector of a device part in the imaging device 10
- OL: distance from the object side of the first lens 110 to a photodetector with reference to an optical axis
- f: focal length of the imaging device 10 with reference to the optical axis
- D: aperture of an entrance pupil of the imaging device 10

Conditional Expression 1 defines a range of a ratio of a lens rear section with respect to the focal length of the imaging device 10. Conditional Expression 2 defines share of a receiving space for internal lenses for an entire length of the imaging device 10. By meeting Conditional Expressions 1 and 2, the imaging device 10 may be implemented as a micro imaging device applicable to a mobile device. When FBL/f of Conditional Expression 1 exceeds 0.35, the lens rear section is considered to be excessively large. In this case, capability for restricting an aberration in the imaging device 10 may be reduced, thereby reducing the performance. Also, the imaging device 10 may be inapplicable for high resolution use. When FBL/f of Conditional Expression 1 is less than 0.25, a clearance distance between the photodetector and the lens is considered to be insufficient. Therefore, in this case, the imaging device 10 may not be implemented as an actual product. When OL/FBL of Conditional Expression 2 exceeds 4.5, it is difficult to manufacture the imaging device 10 in a small size. When OL/FBL of Conditional Expression 2 is less than 3.5, thickness of the internal lens of the imaging device 100 is extremely reduced. Therefore, it is difficult to implement the imaging device 10 as an actual product by a conventional manufacturing method.

Conditional Expression 3 defines size of the entrance pupil and transmittance of the imaging device 10. When meeting Conditional Expression 3, the imaging device 10 may achieve high performance even with a photodetector having a small pixel size.

Shapes of the second lens 120 and the fourth lens 140 may be determined by Conditional Expression 4 and Conditional Expressions 5-1 and 5-2, as follows:

$$-5.0 > L2R1 > -10.0 \quad \text{[Conditional Expression 4]}$$

$$0.5 < L2R2 < 4.0 \quad \text{[Conditional Expression 5-1]}$$

$$0.5 < L4R2 < 4.0 \quad \text{[Conditional Expression 5-2]}$$

Reference symbols used in Conditional Expression 4 and Conditional Expressions 5-1 and 5-2 will be defined, as follows:
- L2R1: radius of the object side of the second lens 120
- L2R2: radius of the imaging side of the second lens 120
- L4R2: radius of the imaging side of the fourth lens 140

Conditional Expression 4 defines the radius of the object side of the second lens 120. Conditional Expressions 5-1 and 5-2 define the radius of the imaging side of the second lens 120 and the radius of the imaging side of the fourth lens 140. The shapes of the second lens 120 and the fourth lens 140 may be determined by Conditional Expression 4 and Conditional Expressions 5-1 and 5-2. The second lens 120 and the fourth lens 140 may improve stability in performance and sensitivity of the imaging device 10.

Focal lengths of the first lens 110 and the second lens 120 may be determined by Conditional Expression 6 and Conditional Expression 7, respectively, as follows:

$$1.5 < f1 < 2.5 \quad \text{[Conditional Expression 6]}$$

$$-4.0 < f2 < -3.0 \quad \text{[Conditional Expression 7]}$$

Reference symbols used in Conditional Expression 6 and Conditional Expression 7 will be defined, as follows:
- f1: a focal length of the first lens 110
- f2: a focal length of the second lens 120

Conditional Expression 6 defines the focal length of the first lens 110. Conditional Expression 7 defines the focal length of the second lens 120.

In the first lens to fourth lens 110, 120, 130, and 140, aspherical surfaces may be calculated by Equation 8. In Equation 8, 'E and subsequent numbers' used in Conic constant K and aspherical coefficients A, B, C, D, and E may refer to involutions of 10, as follows:

$$z = \frac{cY^2}{1 + \sqrt{1 - (1+K)c^2Y^2}} + AY^4 + BY^4 + CY^4 + DY^4 + EY^4 + FY^4 + \ldots \quad \text{[Equation 8]}$$

Reference symbols used in Equation 8 will be defined, as follows:
- Z: distance from a vertex of a lens to an optical axis
- c: basic curvature of the lens
- Y: distance orthogonal to the optical axis
- K: Conic constant
- A, B, C, D, and E: aspherical coefficients Another embodiment illustrated in FIG. 2 is configured almost the same as the embodiment of FIG. 1 except that an aperture diaphragm 200 is disposed between a first lens 210 and a second lens 220 and that a shape of a lens is partially different.

Figure 2:
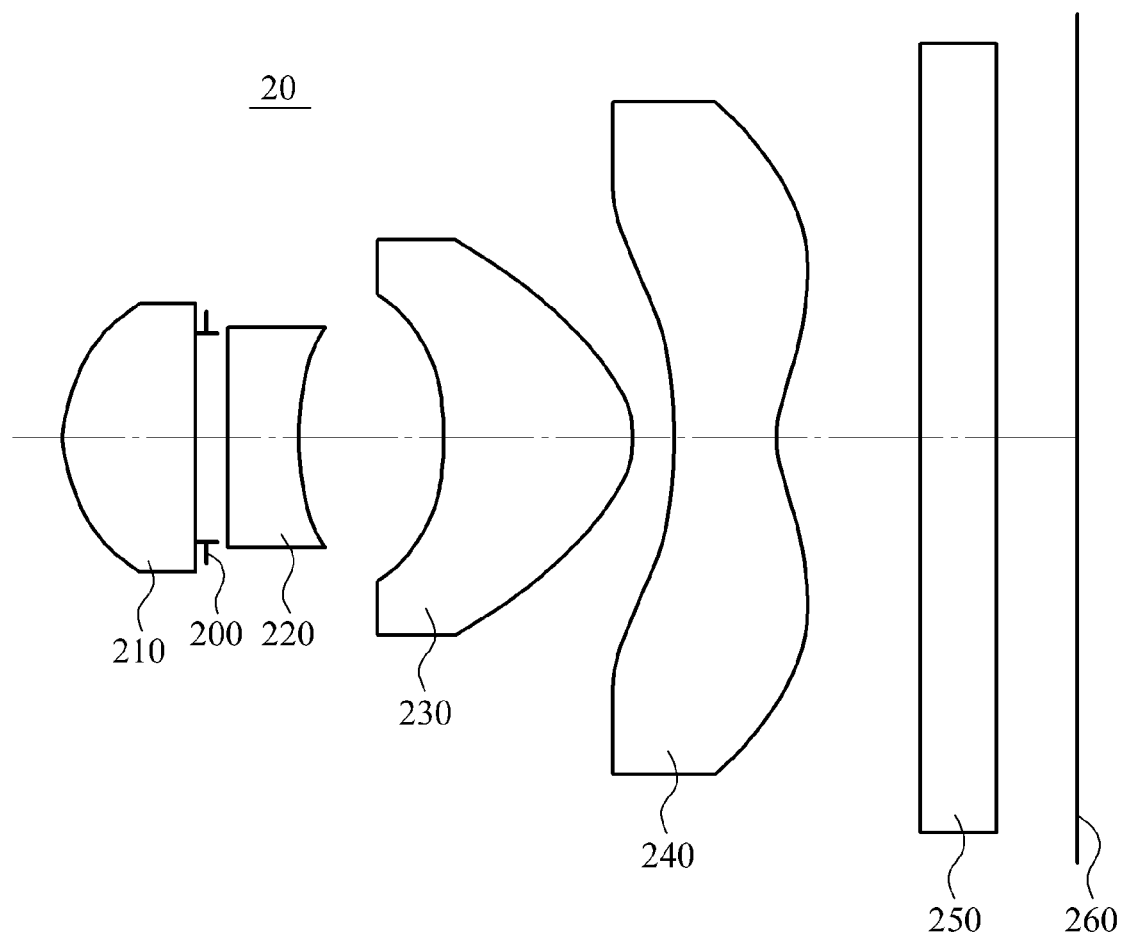
FIG. 2 is a sectional diagram of an imaging device according to another exemplary embodiment.

An imaging device 20 according to the embodiment of FIG. 2 includes a first lens 210, a second lens 220, a third lens 230, and a fourth lens 240, a filter 250, and a photodetector 260 which are arranged in sequence from an object. The aperture diaphragm 200 is disposed between the first lens 210 and the second lens 220.

The first lens to fourth lens 210, 220, 230, and 240 may each have a positive or negative refractive power. In one example, the first lens to fourth lens 210, 220, 230, and 240 may have a refractive index in a range between about 1.4 and about 2.0. At least one of the first lens to fourth lens 210, 220, 230, and 240 may have a refractive index of about 1.61 or greater.

The second lens 220 may have an object side and an imaging side both in a concave shape. The third lens 230 may have an object side and an imaging side both in an aspherical shape. The fourth lens 240 may have an object side and an imaging side both in an aspherical shape. In addition, the first lens to fourth lens 210, 220, 230, and 240 may be configured to meet Conditional Expression 1 to Conditional Expression 7. The lenses 210, 220, 230, and 240 of the embodiment of FIG. 2 may meet part or all of Conditional Expression 1 to Conditional Expression 7.

At least one of an infrared filter and an optical filter such as a cover glass may be used as the filter 250. The photodetector 260 may include an image sensor, for example, a CCD and a CMOS.

Table 1 below shows focal lengths of the first lens 110 to the fourth lens 140 of the embodiment of FIG. 1 and the first lens 210 to the fourth lens 240 of the embodiment of FIG. 2, meeting Conditional Expression 1. Table 2 below shows other data of the embodiments of FIGS. 1 and 2, meeting Conditional Expression 2. A unit of measurements such as distance and length used in Tables 1 and 2 is a millimeter (mm)

TABLE 1

| Focal length of lenses | Embodiment 1 | Embodiment 2 |
|---|---|---|
| f1 | 2.187 | 2.001 |
| f2 | −3.938 | −3.301 |
| f3 | 2.285 | 1.659 |
| f4 | −2.099 | −1.598 |

TABLE 2

| Other data | Embodiment 1 | Embodiment 2 |
|---|---|---|
| F | 3.184 | 3.252 |
| Effective diagonal length of photodetector | 2.268 | 2.268 |
| OL | 3.837 | 3.855 |
| FBL | 0.890 | 0.980 |
| F Number (=f/D) | 2.510 | 2.552 |

Table 3 shows data of the embodiment of FIG. 1, meeting Conditional Expression 1 to Conditional Expression 7 in further details. Table 4 shows data of the embodiment of FIG. 2, meeting Conditional Expression 1 to Conditional Expression 7 in further details. A unit of measurements such as distance and length used in Tables 3 and 4 is a mm. A sign "*" written next to a side number in Tables 3 and 4 indicates an aspherical surface.

TABLE 3

| Side No. | Radius of curvature (R) | Thickness or distance (d) | Refractive index (Nd) | Abbe value (Vd) | Note |
|---|---|---|---|---|---|
| 1 * | 1.305 | 0.506 | 1.531 | 55.8 | First lens |
| 2 * | −9.220 | 0.090 | — | — | First lens |
| 3 * | −9.563 | 0.256 | 1.635 | 24.0 | Second lens |
| 4 * | 3.470 | 0.528 | — | — | Second lens |
| 5 * | −2.166 | 0.663 | 1.531 | 55.8 | Third lens |
| 6 * | −0.863 | 0.276 | — | — | Third lens |
| 7 * | 6.531 | 0.333 | 1.531 | 55.8 | Fourth lens |
| 8 * | 0.939 | 0.487 | — | — | Fourth lens |
| 9 | 0 | 0.300 | 1.517 | 64.2 | Filter |
| 10 | 0 | 0.300 | — | — | Filter |
| 11 | 0 | — | — | — | Photodetector |

TABLE 4

| Side No. | Radius of curvature (R) | Thickness or distance (d) | Refractive index (Nd) | Abbe value (Vd) | Note |
|---|---|---|---|---|---|
| 1 * | 1.159 | 0.509 | 1.544 | 56.1 | First lens |
| 2 * | −16.447 | 0.103 | — | — | First lens |
| 3 * | −7.686 | 0.260 | 1.635 | 24.0 | Second lens |
| 4 * | 2.963 | 0.564 | — | — | Second lens |
| 5 * | −1.955 | 0.731 | 1.544 | 56.1 | Third lens |
| 6 * | −0.701 | 0.151 | — | — | Third lens |
| 7 * | −3.911 | 0.391 | 1.531 | 55.8 | Fourth lens |
| 8 * | 1.128 | 0.547 | — | — | Fourth lens |
| 9 | 0 | 0.300 | 1.517 | 64.2 | Filter |
| 10 | 0 | 0.300 | — | — | Filter |
| 11 | 0 | 0 | — | — | Photodetector |

Next, Table 5 shows aspherical coefficients of the respective lenses of the embodiment of FIG. 1, meeting Conditional Expression 1 to Conditional Expression 7, and Equation 8. Table 6 shows aspherical coefficients of the respective lenses of the embodiment of FIG. 2.

TABLE 5

| Side No. | K | A | B | C | D | E | F |
|---|---|---|---|---|---|---|---|
| 1 | −4.26164E−01 | 2.71019E−02 | −1.48482E−01 | 5.87979E−01 | −1.35082E+00 | 6.70213E−01 | — |
| 2 | −1.84241E+02 | −2.95355E−02 | −4.86392E−01 | 3.56905E+01 | −4.15418E−01 | 3.15168E−01 | — |
| 3 | −9.07546E−01 | 6.33457E−02 | −6.06635E−01 | 1.74126E−01 | 9.13539E−01 | −4.04908E−01 | — |
| 4 | 7.02391E+00 | 1.20785E−01 | −3.21712E−01 | 2.62573E−01 | 1.83983E−01 | 6.01569E−03 | — |
| 5 | −3.61652E−01 | −4.60603E−01 | 8.54993E−01 | −2.42953E+00 | 2.97221E+00 | −1.40118E+00 | −6.08163E−01 |
| 6 | −2.92191E+00 | −1.42944E−01 | −2.36581E−02 | −3.28798E−02 | 4.59023E−02 | −3.86645E−02 | 4.48264E−02 |
| 7 | −1.18823E+03 | −2.18041E−01 | 2.71431E−02 | 9.37981E−02 | −5.65543E−02 | 1.28967E−02 | −1.07528E−03 |
| 8 | −6.82416E+00 | −1.79606E−01 | 9.34592E−02 | −4.31209E−02 | 1.28191E−02 | −1.95671E−03 | 1.04931E−04 |

TABLE 6

| Side No. | k | A | B | C | D | E | F |
|---|---|---|---|---|---|---|---|
| 1 | −1.39384E−01 | 6.41428E−03 | 2.18943E−01 | −9.52083E−01 | 2.21967E+00 | −1.86435E+00 | — |
| 2 | 9.63703E+01 | 2.09920E−01 | −3.84463E−01 | 9.34466E−01 | −2.48837E+00 | 2.03905E+00 | — |
| 3 | −6.26914E+02 | 2.47631E−01 | −2.75693E−01 | −4.31773E−01 | −4.45491E−01 | 4.65867E+00 | −8.01806E+00 |
| 4 | 8.96736E+00 | 3.30417E−01 | −2.57023E−01 | −1.15051E+00 | 4.99831E+00 | −7.40833E+00 | 4.07362E+00 |
| 5 | 4.01032E+00 | −5.85947E−02 | 5.82921E−02 | −4.94994E−01 | 1.21756E+00 | −8.80821E−01 | — |
| 6 | −4.02607E+00 | −4.96367E−01 | 7.75462E−01 | −1.08628E+00 | 8.79966E−01 | −2.71666E−01 | — |
| 7 | −1.04158E+02 | −2.44118E−01 | 2.18004E−01 | −8.20733E−02 | 1.54752E−02 | −1.26804E−03 | 6.81234E−06 |
| 8 | −1.12046E+01 | −1.73447E−01 | 1.01047E−01 | −4.48157E−02 | 1.07604E−02 | −1.01832E−03 | −1.75951E−06 |

Figure 3A:
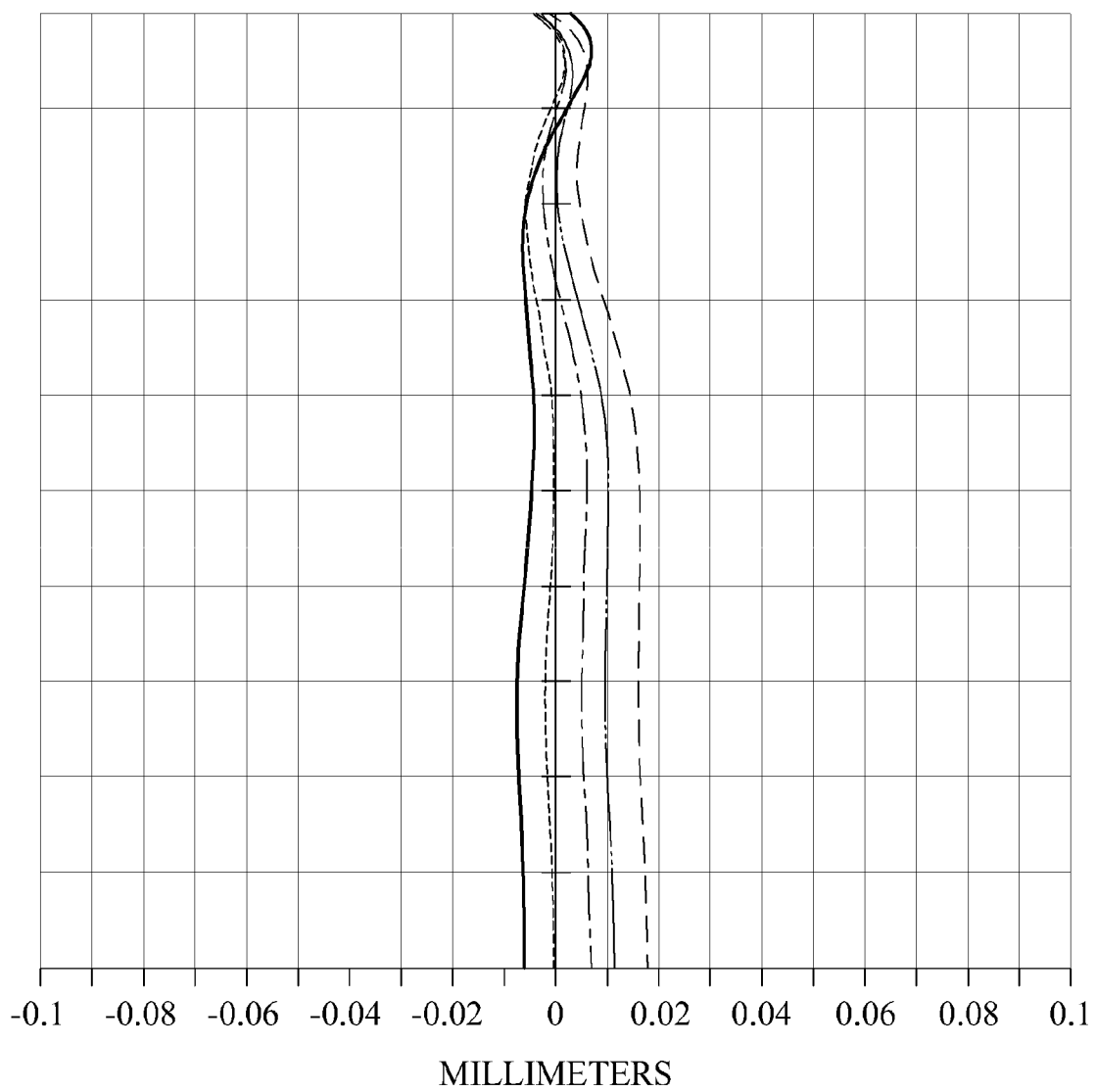
Figure 4A:
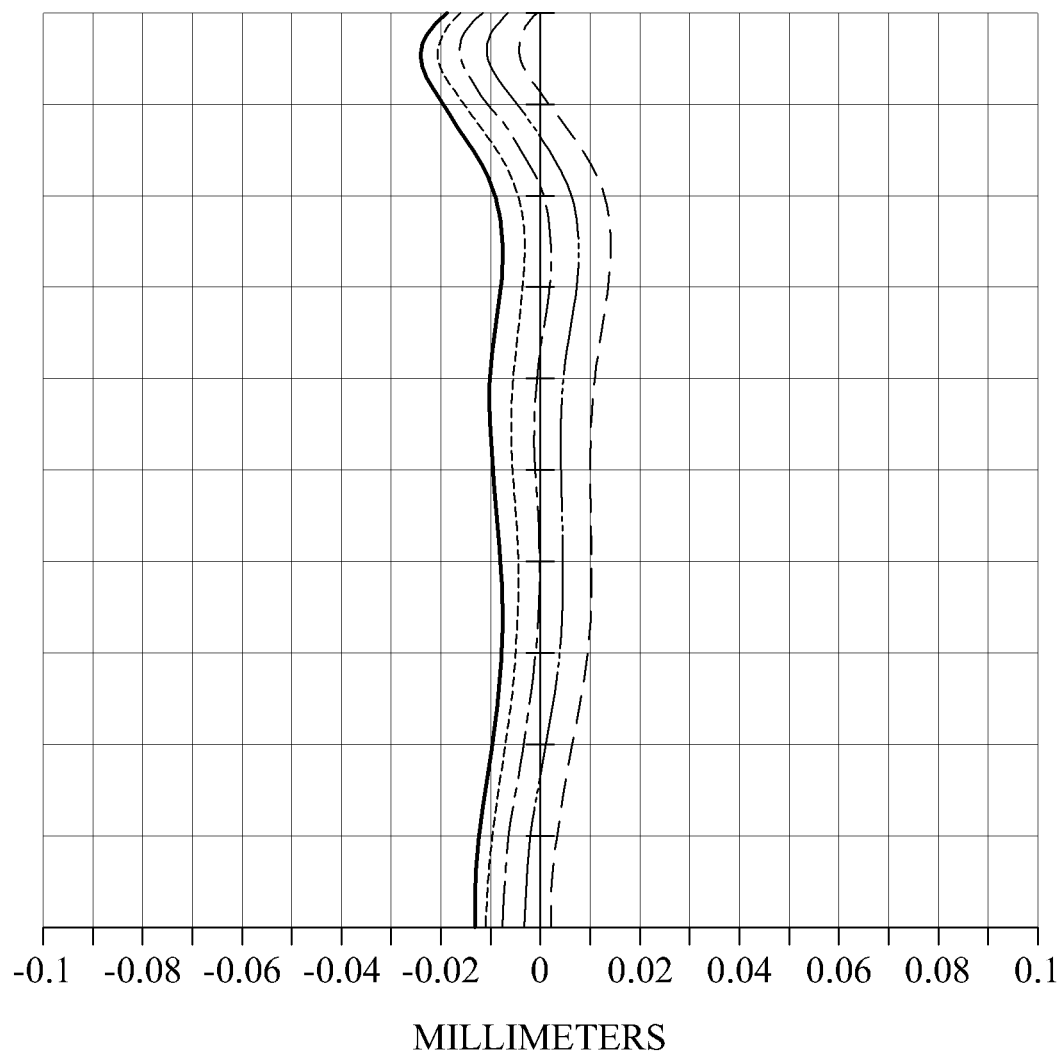
Figure 4B:
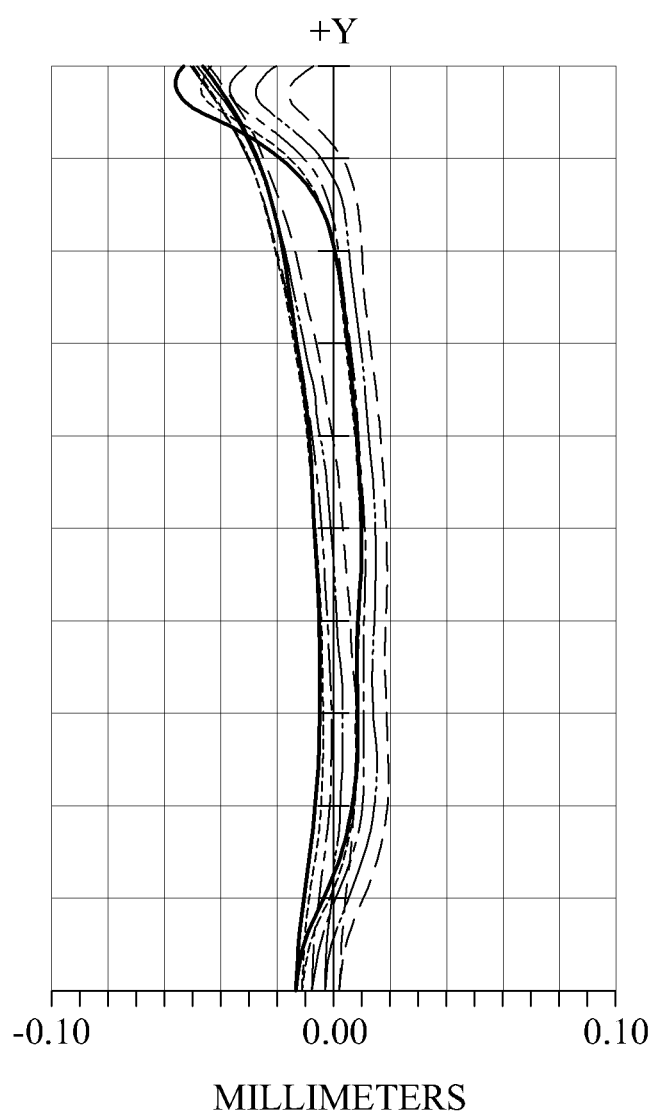

FIGS. 3A to 3C are graphs illustrating aberrations of the imaging device 10 according to the embodiment of FIG. 1. FIGS. 4A to 4C are graphs illustrating aberrations of the imaging device 20 according to the embodiment of FIG. 2. In detail, FIGS. 3A and 4A illustrate a longitudinal spherical aberration, FIGS. 3B and 4B illustrate an astigmatic field curve, and FIGS. 3C and 4C illustrate a distortion.

According to the embodiments, an imaging device having high performance and high transmittance may be achieved without increasing a lens receiving space in the imaging device or increasing an aperture. Also, a high-resolution imaging device appropriate for a mobile use may be achieved.

It will be understood that various modifications may be made to the embodiments disclosed herein. Therefore, the above description should not be construed as limiting, but merely as exemplifications of the various embodiments. Those skilled in the art will envision other modifications within the scope and spirit of the claims appended hereto. The desired effect may be obtained with a lens structure meeting only part of the disclosed Conditional Expressions and/or Equations.

Although exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. An imaging device equipped with a photodetector, the imaging device comprising:
   a first lens having a positive or negative refractive power;
   a second lens having a positive or negative refractive power and including an object side which is concave;
   a third lens having a positive or negative refractive power and including an object side and an imaging side which are both aspherical; and
   a fourth lens having a positive or negative refractive power and including an object side and an imaging side which are both aspherical,
   wherein the first lens to the fourth lens are arranged in sequence from an object, and the imaging device meets Conditional Expression 1 to Conditional Expression 3:

$0.25 < FBL/f < 0.35$  [Conditional Expression 1]

$3.5 < OL/FBL < 4.5$  [Conditional Expression 2]

$f/D \leq 2.6$  [Conditional Expression 3]

where FBL denotes a distance from a last imaging side to a photodetector of a device part in the imaging device, OL denotes a distance from the object side of the first lens to the photodetector with reference to an optical axis, f denotes a focal length of the imaging device with reference to the optical axis, and D denotes an aperture of an entrance pupil of the imaging device.

2. The imaging device of claim 1, further including an aperture diaphragm disposed at the object side of the first lens or between the first lens and the second lens.

3. The imaging device of claim 1, wherein at least one of the first lens to the fourth lens has a refractive index of about 1.610 or greater with reference to the refractive index.

4. The imaging device of claim 1, wherein the second lens meets Conditional Expression 4:

$-5.0 > L2R1 > -10.0$  [Conditional Expression 4]

where L2R1 denotes a radius of the object side of the second lens.

5. The imaging device of claim 1, wherein the second lens meets Conditional Expression 5-1:

$0.5 < L2R2 < 4.0$, and  [Conditional Expression 5-1]

wherein the fourth lens meets Conditional Expression 5-2:

$0.5 < L4R2 < 4.0$  [Conditional Expression 5-2]

where L2R2 denotes a radius of the imaging side of the second lens and L4R2 denotes a radius of the imaging side of the fourth lens.

6. The imaging device of claim 1, wherein the second lens meets Conditional Expression 6:

$1.5 < f1 < 2.5$  [Conditional Expression 6]

where f1 denotes a focal length of the first lens.

7. The imaging device of claim 1, wherein the second lens meets Conditional Expression 7:

$-4.0 < f2 < -3.0$  [Conditional Expression 7]

wherein, f2 denotes a focal length of the second lens.

* * * * *